United States Patent [19]

Koser

[11] 4,043,167

[45] Aug. 23, 1977

[54] PROCESS AND MACHINE FOR FINISHING A 15° TO 180° PIPE BEND WHICH HAS BEEN PREFORMED ON A PIPE BENDING PRESS

[75] Inventor: Rolf Koser, Bunde, Germany

[73] Assignee: Sidro KG Ludwig Moller Fabrik fur Rohrbogen, Bunde, Germany

[21] Appl. No.: 714,161

[22] Filed: Aug. 13, 1976

[30] Foreign Application Priority Data

Jan. 23, 1976 Germany .............................. 2602415

[51] Int. Cl.² .............................................. B21D 7/16
[52] U.S. Cl. .................................. 72/340; 29/157 A; 83/471.2; 83/472
[58] Field of Search ................. 72/340, 324, 341, 368, 72/370, 380, 369, 367; 83/471.2, 471.3, 472, 473, 488, 489; 29/157 A, 157 R; 285/179, 182, 183

[56] References Cited

U.S. PATENT DOCUMENTS

| | | | |
|---|---|---|---|
| 1,781,567 | 11/1930 | Böhling | 29/157 A |
| 1,960,788 | 5/1934 | Maroto | 29/157 A X |
| 2,500,813 | 3/1950 | Fritsch | 29/157 A |
| 3,827,325 | 8/1974 | Ward et al. | 83/471.2 X |

FOREIGN PATENT DOCUMENTS

1,900,908  10/1970  Germany .............................. 72/367

*Primary Examiner*—Lowell A. Larson
*Attorney, Agent, or Firm*—John C. Smith, Jr.

[57] ABSTRACT

A process for finishing a 15° to 180° pipe bend which has been preformed on a pipe bending press comprises submitting a preformed pipe bend at a temperature of 700° to 900° C. at which it leaves a pipe bending press to a hot sizing operation which includes trimming both ends of the pipe bend to precise dimensions to eliminate further finishing.

8 Claims, 1 Drawing Figure

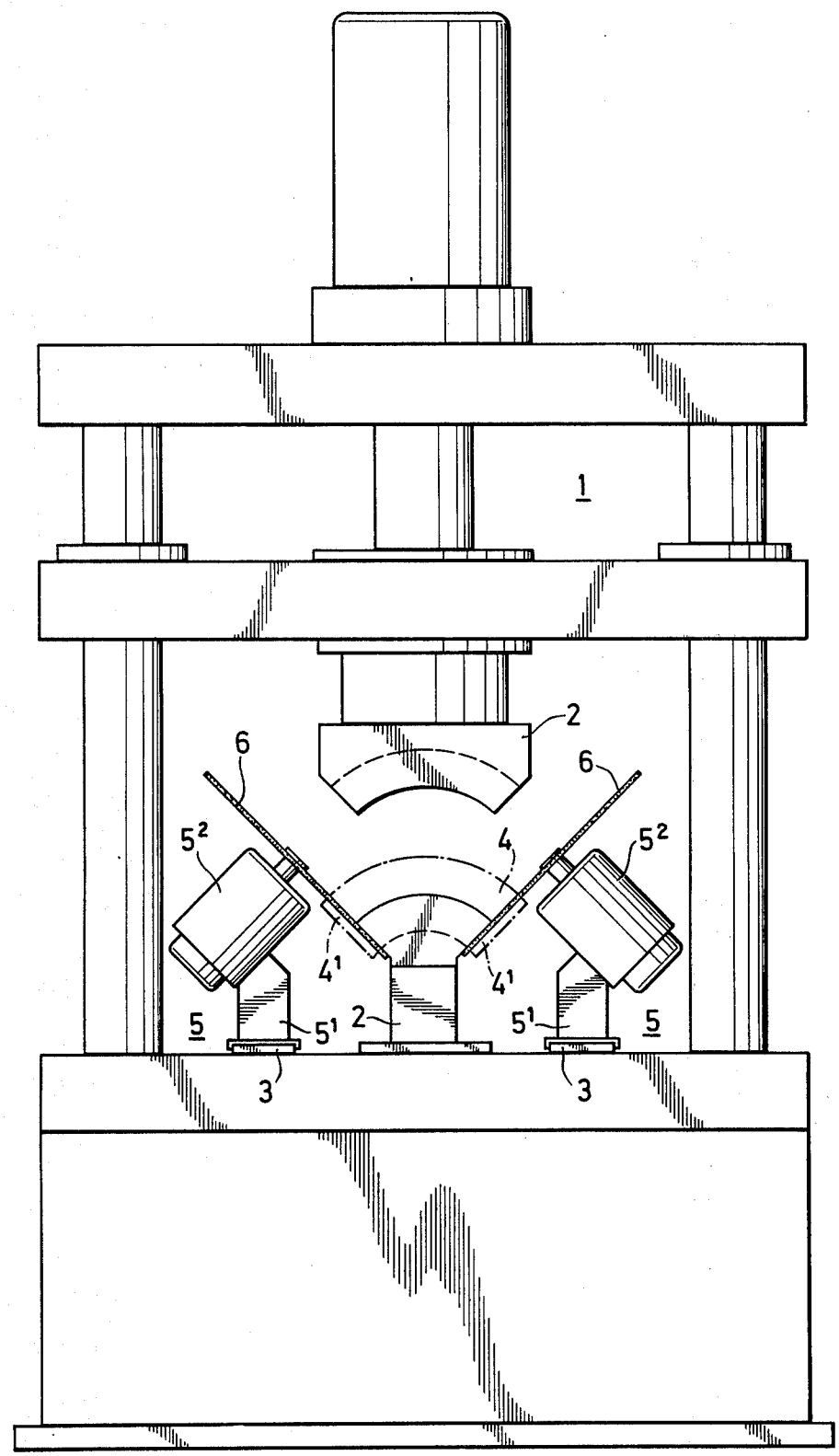

PROCESS AND MACHINE FOR FINISHING A 15° TO 180° PIPE BEND WHICH HAS BEEN PREFORMED ON A PIPE BENDING PRESS

BACKGROUND OF THE INVENTION

This invention relates to a process for finishing a 15° to 180° pipe bend which has been preformed on a pipe bending press, as well as to a machine for performing the process.

Processes for the production of pipe bends have been known in the art for a long time. Calculated lengths of pipe are cut off a straight pipe to provide blanks which are bent over a conventional knee or bending mandrel. By this operation the blank is deformed to a pipe bend, the pipe bending press delivering preformed 15° to 180° bends.

According to the nature and state of the material these preformed bends leave the pipe bending press at a temperature between 700° and 900° C. The diameter of the bends after they have been bent is no longer uniform and it is therefore necessary to correct this by sizing the preforms in a die. Horizontal dies are normally used for this sizing operation. After sizing it is necessary to cool the pipe bend before it is subjected to further operations.

As soon as the pipe bend is sufficiently cool it is taken to the trimming shop. Here the pipe bend is cut to a 90° angle by a two-cut or three-cut saw. Naturally other angles can be cut if desired. However, this trimming operation is always performed within the upper tolerance range. Sometimes even this may be exceeded, in which case the pipe bend must be subjected to further finishing work to comply with design dimensions. However, cold sizing merely relates to the finishing of the ends, i.e. the ends of the pipe bend are reduced to within the admissible tolerance range. Should the end finishing operation affect the angle of the pipe bend, then the ends must be reground to the wanted angle, e.g. 90°. Regrinding will also be necessary if the pipe bend had not been precisely clamped up to the saw blade which will then make an oblique cut. All this finishing work which is necessary to keep within the prescribed tolerance limits is mainly manual work. Recently tolerances for pipe or tube bends used in marine engineering have been further tightened with a consequential rise in the cost of production due to the extra finishing work, bearing in mind that normal tolerances are already difficult to observe.

SUMMARY OF THE INVENTION

It has been the aim of the present inventor to provide a process for the production of dimensionally accurate pipe bends and a machine for performing the process, which will overcome the above-described difficulties.

The process according to the invention comprises submitting a preformed pipe bend at a temperature of 700° to 900° C. at which it leaves a pipe bending press to a hot sizing operation which includes trimming both ends of the pipe bend to precise dimensions so that no further finishing work is needed.

The machine proposed for performing the process comprises a frame containing an upright open die operable by hydraulic or like means and, mounted on slides, supports or swivel arms traversible in said frame, two separate trimming devices which are angularly adjustable to the angle of the pipe bend and adapted to trim off the ends of the pipe bends to precise specification.

Each of the trimming devices may comprise an electric motor which on its shaft carries a grinding disc or a saw blade and which is pivotally supported by a supporting arm.

Alternatively each of the trimming devices may be in the form of a supporting arm pivotally supporting a member fitted with a cutting means in the form of an electrolyte.

The process according to the invention is intended more particularly for the economical high precision production of pipe bends, the proposed machine being designed to finish the pipe bend to within prescribed fine tolerance limits by combining the reshaping, sizing and trimming operations.

BRIEF DESCRIPTION OF THE DRAWING

In order that the invention may be more readily understood the process will now be described by way of example and with reference to the accompanying drawing in which the only FIGURE is a schematic front elevational view of a machine according to the invention.

DESCRIPTION OF THE PREFERRED EMBODIMENT

The drawing shows a preformed hot pipe bend 4 which has been ejected from a pipe bending press, loaded manually or by mechanical transfer means between the upper die and the lower die of an open die 2 in an upright machine frame 1. For sizing the hot pipe bend 4 the die 2 is closed in conventional manner, for instance by hydraulic means. During the sizing operation two trimming devices 5 mounted on slides or supports 3 are traversed into the machine frame 1 and trim off the projecting ends $4^1$ of the pipe bend 4, thus producing a finished pipe bend of precise overall dimensions which calls for no further finishing work. Each trimming device 5 consists of two parts, namely a supporting arm $5^1$ and an electric motor $5^2$ pivotally mounted thereon by means of a pivot joint. Detachably affixed to the shaft of the electric motor $5^2$ is a trimming tool which may be a grinding disc or a saw blade 6. The electric motor $5^2$ might be replaced by a separate member adapted to remove the ends $4^1$ from the pipe bend 4 electrolytically. Moreover, each trimming device 5 could also be conveniently mounted on a swivel arm.

The pivot joint between the supporting arm $5^1$ and the electric motor $5^2$ permits the trimming tools of the trimming devices 5 to be adjusted to the desired angle for machining the ends of the pipe bend 4. In the drawing the two discs or blades 6 of the trimming devices 5 together include an angle of 90°.

When the die 2 is reopened the severed pipe bend ends $4^1$ drop into a scrap bin, and the finished pipe bend is deposited on a conveyor belt. The conveyor belt may serve additional working stations, and the proposed process and the machine may therefore be incorporated in an automatic production line.

With reference to additional working stations the inventor has in mind for instance chamfering equipment for the preparation of weld faces according to customer's requirements. Moreover, a sandblasting tunnel may also be provided for automatically descaling the pipe bend. Another facility would be a dressing and dipping station for rustproofing the bend. The final station would be a packaging machine for packing the pipe bends 4 ready for despatch.

The advantage of the invention over conventional machines and processes is that pipe bends which have been correctly sized hot in a die and simultaneously trimmed at both ends exhibit a dimensional accuracy which otherwise could be attained only by additional finish machining involving a great deal of expense. The position of the die is of secondary importance, the decisive feature being that sizing of the hot bend and the trimming of both ends are effected in one operation without previous cooling of the bend. The trimming operation can therefore be performed in the high temperature range (700° to 900° C.). The illustrated machine thus permits the pipe bend to be finished during the sizing operation. Imprecision which might call for subsequent finishing work will not occur and the expense otherwise involved in such finishing work can be saved, or at least greatly reduced, since taking a long term view the cost of the machine for performing the present process is disproportionately less than the economies it provides, particularly bearing in mind that the machine admits of various modifications within the ambit of the contemplated process.

The invention may be embodied in other specific forms without departing from the spirit or essential characteristics thereof. The embodiment is therefore to be considered in all respects as illustrative and not restrictive.

What is claimed is:

1. A process for finishing a 15° to 180° pipe bend which has been preformed on pipe press, comprising
   a. sizing said preformed pipe bend between coacting dies while said pipe bend is at a temperature of 700°–900° C and
   b. simultaneously trimming both ends of said pipe bend to precise dimensions while said pipe bend is retained between said dies whereby further finishing of said pipe bend is eliminated.

2. A machine for finishing a 15° to 180° pipe bend which has been preformed on a pipe bending press, comprising
   a. a frame member;
   b. a pair of open coacting dies for sizing preformed hot 15° to 180° pipe bends positioned therebetween, the length of said dies being less than the length of the pipe bends whereby the opposite ends of the pipe bends project from between said dies;
   c. means stationarily mounting one of said dies on said frame member;
   d. means, mounted on said frame member, for moving the other of said dies toward said stationary die to size a pipe bend and away from stationary die to release said pipe bend after sizing;
   e. a pair of trimming devices located at opposite sides, respectively, of said stationary die; and
   f. means, positioned on said frame member, mounting each of said trimming devices for movement along a path transverse to the axis of said pipe bend to trim opposite projecting ends of said pipe bend while said pipe bend is retained between said dies.

3. A machine as defined in claim 2 wherein said means mounting each of said trimming devices for movement along a path comprises a slide.

4. A machine as defined in claim 2 wherein said means mounting each of said trimming devices for movement along a path comprises a support.

5. A machine as defined in claim 2 wherein said means mounting each of said trimming devices for movement along a path comprises a swivel arm.

6. A machine as defined in claim 2 wherein said means for moving said other die comprises hydraulic means.

7. A machine as defined in claim 2 wherein each trimming device comprises an electric motor, which on its shaft carries a grinding disc and a pivotally mounted supporting arm for adjusting the angle of said grinding disc relative to the axis of said pipe bend.

8. A machine as defined in claim 2 wherein each trimming device comprises an electric motor, which on its shaft carries a saw blade, and a pivotally mounted supporting arm for adjusting the angle of said saw blade relative to the axis of said pipe bend.

* * * * *